United States Patent
Yoshida

(10) Patent No.: US 9,260,339 B2
(45) Date of Patent: Feb. 16, 2016

(54) METHOD OF FABRICATING AN OPTICAL FIBER PREFORM AND A BURNER THEREFOR

(71) Applicant: Shin-Etsu Chemical Co., Ltd., Tokyo (JP)

(72) Inventor: Makoto Yoshida, Kamisu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 75 days.

(21) Appl. No.: 14/187,704

(22) Filed: Feb. 24, 2014

(65) Prior Publication Data

US 2014/0165656 A1 Jun. 19, 2014

Related U.S. Application Data

(62) Division of application No. 12/393,306, filed on Feb. 26, 2009, now abandoned.

(30) Foreign Application Priority Data

Feb. 27, 2008 (JP) .................................. 2008-046856
Feb. 10, 2009 (JP) .................................. 2009-028655

(51) Int. Cl.
*C03B 37/018* (2006.01)
*C03B 37/014* (2006.01)

(52) U.S. Cl.
CPC ......... *C03B 37/01815* (2013.01); *C03B 37/018* (2013.01); *C03B 37/0142* (2013.01); *C03B 2207/06* (2013.01); *C03B 2207/20* (2013.01); *Y02P 40/57* (2015.11)

(58) Field of Classification Search
None
See application file for complete search history.

(56) References Cited

U.S. PATENT DOCUMENTS

| | | |
|---|---|---|
| 3,334,982 A | 8/1967 | Mattmuller |
| 4,224,046 A | 9/1980 | Izawa et al. |
| 4,402,720 A | 9/1983 | Edahiro et al. |

(Continued)

FOREIGN PATENT DOCUMENTS

| | | |
|---|---|---|
| CN | 1279653 A | 1/2001 |
| FR | 1 287 540 A | 3/1962 |

(Continued)

OTHER PUBLICATIONS

JP61-026526 English Translation by FLS, Inc. Oct. 2013.*

(Continued)

*Primary Examiner* — Lisa Herring
(74) *Attorney, Agent, or Firm* — Westerman, Hattori, Daniels & Adrian, LLP

(57) ABSTRACT

A method of fabricating an optical fiber preform, capable of depositing glass particles with high deposition rate without reducing deposition efficiency and fabricating an optical fiber preform having little bubbles using a burner having a simple structure, is provided. In the invention, a mixed gas of a glass raw material gas with a combustion assisting gas is ejected from an annular nozzle of a burner having a coaxially multiple tube structure, and a burnable gas is ejected from an inner nozzle located inside the annular nozzle. Alternatively, a mixed gas of a glass raw material gas with a burnable gas may be ejected from an annular nozzle, and a combustion assisting gas is ejected from an inner nozzle located inside the annular nozzle. In each case of the above, the burnable gas and the combustion assisting gas, respectively, are ejected from outer nozzles located outside the annular nozzle.

4 Claims, 4 Drawing Sheets

(56) References Cited

U.S. PATENT DOCUMENTS

| | | |
|---|---|---|
| 4,465,708 A | 8/1984 | Fanucci et al. |
| 4,627,866 A | 12/1986 | Kanamori et al. |
| 5,110,335 A | 5/1992 | Miller et al. |
| 5,735,928 A | 4/1998 | Sayce et al. |
| 6,688,881 B1 | 2/2004 | Olewicz |
| 7,165,425 B2 | 1/2007 | Uchiyama et al. |
| 2003/0019246 A2 | 1/2003 | Ruppert et al. |
| 2004/0065120 A1* | 4/2004 | Uchiyama ............ C03B 37/0142 65/414 |
| 2004/0182114 A1 | 9/2004 | Ooishi et al. |
| 2004/0261460 A1 | 12/2004 | Roba et al. |
| 2006/0001952 A1 | 1/2006 | Janka et al. |
| 2010/0323311 A1 | 12/2010 | Yoshida |

FOREIGN PATENT DOCUMENTS

| | | |
|---|---|---|
| JP | 61-26526 A | 2/1986 |
| JP | 61-72645 A | 4/1986 |
| JP | 2-164737 A | 6/1990 |
| JP | 04-243929 A | 9/1992 |
| JP | 6-227825 A | 8/1994 |
| JP | 10-101343 A | 4/1998 |
| JP | 2945148 B2 | 9/1999 |

OTHER PUBLICATIONS

European Search Report dated May 8, 2009, issued in corresponding European Patent Application No. 09002895.2 (6 pages).

Korean Office Action dated Dec. 24, 2010, issued in corresponding Korean Patent Application No. 10-2008-0119258 (3 pages).

Japanese Office Action dated Jun. 22, 2012, issued in corresponding Japanese Patent Application No. 2009-028655, with English translation (7 pages).

* cited by examiner

METHOD OF FABRICATING AN OPTICAL FIBER PREFORM AND A BURNER THEREFOR

CROSS-REFERENCE TO RELATED APPLICATIONS AND INCORPORATION BY REFERENCE

This application is a divisional application of U.S. patent application Ser. No. 12/393,306 filed on Feb. 26, 2009, which claims the benefit of Japanese Patent Application Nos. 2008-046856, filed Feb. 27, 2008 and 2009-028655 filed Feb. 10, 2009 which are hereby incorporated by reference herein in their entirety.

BACKGROUND OF THE INVENTION

1. Field of the Invention

The present invention relates to a method of fabricating an optical fiber preform by hydrolyzing a glass raw material in flame to generate glass particles and depositing the glass particles on a rotating starting rod to fabricate an optical fiber preform and a burner therefor.

2. Description of the Related Art

Up until now, various methods have been proposed for fabricating optical fiber preforms. Among these methods, an Outside Vapor Phase Deposition (OVD) Method, in which glass particles generated in burner flame are adhered and deposited on a rotating starting rod while relatively reciprocating the burner and the starting rod to synthesize a porous preform (i.e., soot preform) and the preform is dehydrated and sintered in an electric furnace, is widely used, because the method can make it relatively easy to fabricate an optical fiber preform having a desired refractive index profile and can mass-produce a large-diameter optical fiber preform.

For example, methods disclosed in Japanese Patent Application Laid-Open Nos. H04-243929 (1992) and H10-101343 (1998) and the like eject a glass raw material such as silicon tetrachloride, a burnable gas and a combustion assisting gas from a burner having a coaxially multiple tube structure, in which a plurality of nozzles are coaxially arranged, so that glass particles are generated in burner flame and deposited on a starting rod.

In order to improve the productivity of optical fiber preforms, it is necessary to enhance deposition rate of glass particles. However, the rise of a feed rate of the glass raw material to enhance the deposition rate of the glass particles produces decreases deposition efficiency of the glass particles on a starting rod so that the production cost of the optical fiber preforms increases. In addition, the decrease of the deposition efficiency increases an amount of floating glass particles in a reaction chamber which have not been deposited on the starting rod. As a result, the floating glass particles in a reaction chamber adhere to the surface of soot deposited on the starting rod, so that bubbles maybe formed in the optical fiber preform after it is transparently vitrified.

The reason of the decrease of the deposition efficiency is that the rise of the feed rate of the glass raw material gas makes flow velocity of glass particles greater so that the time required for the glass particles reaching the surface of the soot becomes too short.

A glass raw material gas is usually ejected from an ejection nozzle arranged burner having a coaxially multiple tube structure and glass particles are generated through a hydrolysis reaction of the glass raw material in flame. An enlargement of a diameter of the ejection nozzle for ejecting glass particles reduces a flow velocity of glass particles thereby time required for the glass particles reaching the surface of soot becomes longer. However, the thickness of the ejected glass raw material flame in a radial direction of the nozzle increases, so that the reaction at the center portion of the glass raw material flame is retarded and the resultant deposition efficiency is not improved.

Japanese Patent Application Laid-Open No. H04-243929 (1992) discloses a burner having a coaxially multiple tube structure of which an ejecting nozzle for ejecting a glass raw material is arranged between an ejecting nozzle for a combustion gas and an ejecting nozzle for an oxidation gas. In the burner, however, the combustion gas ($H_2$) and the oxidation gas ($O_2$) are ejected so as to sandwich the glass raw material gas therebetween so that a reaction of forming $H_2O$ slowly progresses. Accordingly, a generation of $SiO_2$ slowly progresses.

Japanese Patent Application Laid-Open No. H10-101343 (1998) discloses a burner having a plurality of nozzles for ejecting a glass raw material, respectively. However, the burner has a complex structure so that it is difficult to mass-produce the preform with reasonable cost and a stable quality.

SUMMARY OF THE INVENTION

An object of the present invention is to provide a method of fabricating an optical fiber preform, capable of depositing glass particles on a starting rod with high deposition rate without reducing deposition efficiency and fabricating an optical fiber preform having little bubbles with the use of a burner having a simple structure and a burner therefor.

The method of fabricating an optical fiber preform according to a first aspect of the present invention is characterized by having a step of ejecting a glass raw material gas, a burnable gas, a combustion assisting gas and a sealing gas from a plurality of nozzles of a burner, respectively, so as to hydrolyze the glass raw material gas in flame and to generate glass particles, the burner having a plurality of tubes with different diameters from each other and being coaxially arranged, the plurality of nozzles being defined by the plurality of tubes, and a step of moving the burner relative to a starting rod so as to deposit the glass particles thereon, wherein in the ejecting step a mixed gas of the glass raw material gas mixed with the combustion assisting gas is ejected from an annular nozzle among the plurality of nozzles, the burnable gas is ejected from an inner nozzle located inside the annular nozzle, and the burnable gas and the combustion assisting gas are ejected from outer nozzles located outside the annular nozzle, respectively.

The method of fabricating an optical fiber preform according to a second aspect of the present invention is characterized by having a step of ejecting a glass raw material gas, a burnable gas, a combustion assisting gas and a sealing gas from a plurality of nozzles of a burner, respectively, so as to hydrolyze the glass raw material gas in flame and generate glass particles, the burner having a plurality of tubes with different diameters from each other and being coaxially arranged, the plurality of nozzles being defined by the plurality of tubes, and a step of moving the burner relative to a starting rod so as to deposit the glass particles thereon, wherein in the ejecting step a mixed gas of the glass raw material gas mixed with the burnable gas is ejected from an annular nozzle among the plurality of nozzles, the combustion assisting gas is ejected from an inner nozzle located inside the annular nozzle, and the burnable gas and the combustion assisting gas are ejected from the outer nozzles located outside the annular nozzle, respectively.

The burner for fabricating an optical fiber preform according to a third aspect of the present invention is characterized by having a plurality of tubes with different diameters from each other and being coaxially arranged so as to define a plurality of nozzles, the plurality of nozzles including an annular nozzle configured to eject a glass raw material gas mixed with a burnable gas, an inner nozzle located inside the annular nozzle and configured to eject a burnable gas and outer nozzles configured to eject a burnable gas and a combustion assisting gas, respectively.

The burner for fabricating an optical fiber preform according to a fourth aspect of the present invention is characterized by having a plurality of tubes with different diameters from each other and being coaxially arranged so as to define a plurality of nozzles, the plurality of nozzles including an annular nozzle configured to eject a glass raw material gas mixed with a burnable gas, an inner nozzle located inside the annular nozzle and configured to eject a combustion assisting gas and outer nozzles located outside the annular nozzle and configured to eject a burnable gas and a combustion assisting gas, respectively.

According to the present invention, it becomes possible to enhance deposition rate of glass particles without reducing deposition efficiency of the glass particles and fabricate an optical fiber preform with little bubbles, using a burner having a simple structure.

Further features of the present invention will become apparent from the following description of specific embodiments with reference to the attached drawings.

DESCRIPTION OF THE EMBODIMENTS

In the present invention, a mixed gas of a glass raw material gas with a combustion assisting gas is ejected from an annular nozzle of a burner having a coaxially multiple tube structure, and a burnable gas is ejected from a nozzle located inside the annular nozzle. Alternatively, a mixed gas of a glass raw material gas mixed with a burnable gas may be ejected from an annular nozzle, and a combustion assisting gas may be ejected from a nozzle located inside the annular nozzle. In each case of the above, the burnable gas and the combustion assisting gas are ejected from respective nozzles located outside the annular nozzle, respectively.

According to the present invention, thickness of ejected glass raw material gas flow in the radial direction of the annular nozzle can be reduced, because the glass raw material gas is ejected from the annular nozzle instead of a circular nozzle. Additionally, diffusion of the glass raw material gas flow toward both of inside and outside the annular nozzle can facilitate a reaction of the glass raw material gas. As a result, the deposition efficiency of glass particles is not decreased even if a feed rate of the glass raw material gas to the burner is increased to enhance a deposition rate of the glass particles. Further, since the deposition efficiency is not lowered, an amount of floating glass particles in a reaction chamber is not increased, so that an optical fiber preform with little bubbles can be fabricated.

Figure 1:
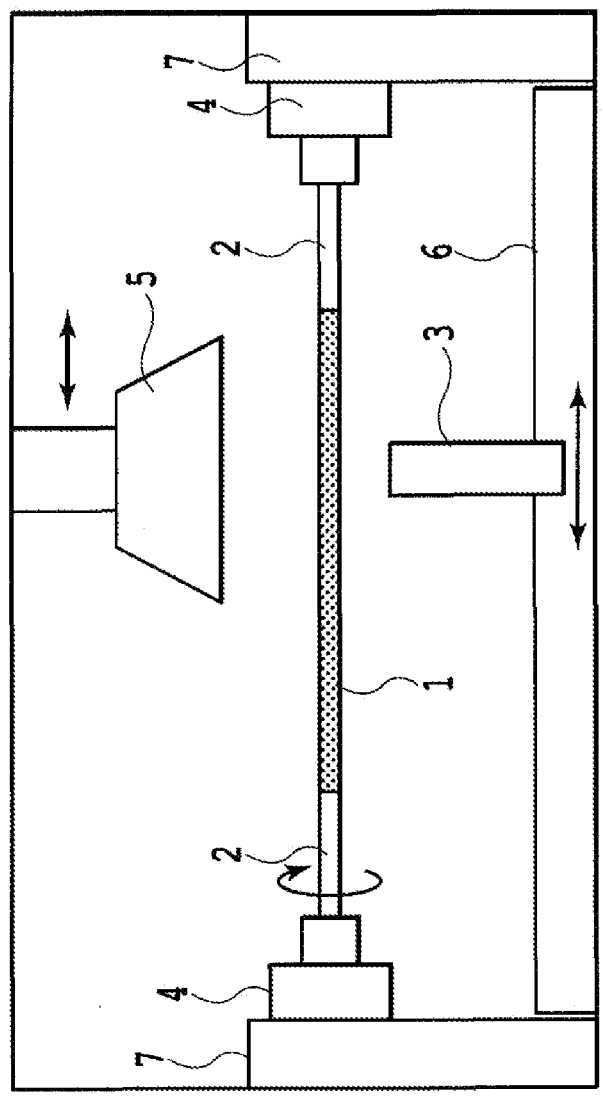
FIG. 1 is a schematic view showing an apparatus for fabricating an optical fiber glass preform by the Outside Vapor Phase Deposition (OVD) Method.

FIG. 1 schematically shows an example of an apparatus for fabricating an optical fiber preform used in Examples 1 and 2. In FIG. 1, a starting rod, on which glass particles are to be deposited, is formed by welding a dummy rod 2 at the both ends of a core rod 1. The starting rod is held by chucking and rotating mechanisms 4 at both ends thereof. Each of the chucking and rotating mechanisms 4 is mounted on a supporting member 7 and rotates the starting rod about the axis thereof. A burner 3 sprays vapor of an optical fiber raw material such as $SiCl_4$ and combustion gas (hydrogen gas and oxygen gas) on the starting rod, which is rotated about the axis thereof, while being reciprocated in longitudinal directions of the starting rod by a burner moving mechanism 6. As a result, glass particles generated by the hydrolysis in oxyhydrogen flame are deposited on the starting rod so that a porous optical fiber preform is formed. Here, the reference numeral 5 indicates an exhausting hood for exhausting the vapor and the combustion gas.

EXAMPLE 1

Figure 2:
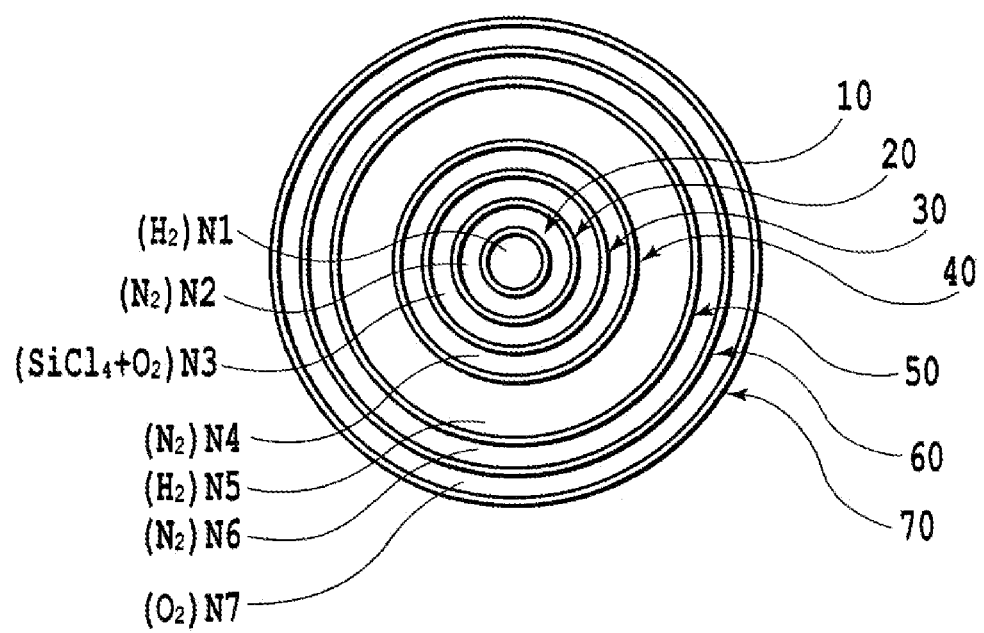
FIG. 2 is a front view showing a nozzle arrangement of a burner with a coaxial seven tube structure, which was used in Examples 1 and 2 of the present invention.

FIG. 2 is a front view showing a nozzle arrangement of the burner 3 having a coaxially multiple tube structure, which was used in Examples 1 and 2. The burner shown in FIG. 2 has a coaxial seven tube structure including a first tube 10, a second tube 20, a third tube 30, a fourth tube 40, a fifth tube 50, a sixth tube 60 and a seventh tube 70 that are arranged coaxially and have different diameters from each other. The first tube 10 defines a circular first nozzle N1. The first tube 10 and the second tube 20 define an annular second nozzle N2. The second tube 20 and the third tube 30 define an annular third nozzle N3. The third tube 30 and the fourth tube 40 define an annular fourth nozzle N4. The fourth tube 40 and the fifth tube 50 define an annular fifth nozzle N5. The fifth tube 50 and the sixth tube 60 define an annular sixth nozzle N6. The sixth tube 60 and the seventh tube 70 define an annular seventh nozzle N7.

In Example 1, a mixed gas of a glass raw material gas $SiCl_4$ mixed with a combustion assisting gas $O_2$ was supplied to the annular third nozzle N3. A burnable gas $H_2$ was supplied to the circular first nozzle N1 arranged inside the annular third nozzle N3. A burnable gas $H_2$ was supplied to the fifth nozzle N5 arranged outside the third nozzle N3. A combustion assisting gas $O_2$ was supplied to the seventh nozzle N7 arranged outside the annular third nozzle N3. Further, a sealing gas $N_2$ was supplied to the second nozzle N2, the fourth nozzle N4 and the sixth nozzle N6, respectively.

Under the above gas conditions, 10 kg of glass particles were deposited on the starting rod. Table 1 shows collectively the type, flow rate and flow velocity of gases supplied to the respective nozzles, and thickness of the respective gas flows in the radial direction of the nozzles at the respective outlets thereof.

TABLE 1

(Example 1)

|  | gas used | flow rate (SLM) | flow velocity (m/s) | thickness of gas flow (mm) |
| --- | --- | --- | --- | --- |
| first nozzle N1 | $H_2$ | 3 | 15.9 | 1.0 |
| second nozzle N2 | $N_2$ | 1 | 1.3 | 1.0 |
| third nozzle N3 | $SiCl_4 + O_2$ | 20 | 15.2 | 1.0 |
| fourth nozzle N4 | $N_2$ | 3 | 1.4 | 1.0 |
| fifth nozzle N5 | $H_2$ | 100 | 16.6 | 2.0 |
| sixth nozzle N6 | $N_2$ | 3 | 0.7 | 1.0 |
| seventh nozzle N7 | $O_2$ | 35 | 3.2 | 2.0 |

EXAMPLE 2

In Example 2, the same burner as in Example 1 was used. A mixed gas of glass raw material gas $SiCl_4$ mixed with a burnable gas $H_2$ was supplied to the annular third nozzle N3. A combustion assisting gas $O_2$ was supplied to the circular first nozzle N1 arranged inside the annular third nozzle N3. A burnable gas $H_2$ was supplied to the fifth nozzle N5 arranged outside the third nozzle N3. A combustion assisting gas $O_2$ was supplied to the seventh nozzle N7 arranged outside the third nozzle N3. Further, a sealing gas $N_2$ was supplied to the second nozzle N2, fourth nozzle N4 and the sixth nozzle N6, respectively.

Under the above gas conditions, 10 kg of glass particles were deposited on the starting rod. Table 2 shows collectively the type, flow rate and flow velocity of gases supplied to the respective nozzles, and thickness of the respective gas flows in the radial direction of the respective nozzles at the respective outlets thereof.

TABLE 2

(Example 2)

|  | gas used | flow rate (SLM) | flow velocity (m/s) | thickness of gas flow (mm) |
| --- | --- | --- | --- | --- |
| first nozzle N1 | $O_2$ | 7.0 | 16.5 | 1.5 |
| Second nozzle N2 | $N_2$ | 1.0 | 1.1 | 1.0 |
| third nozzle N3 | $SiCl_4 + H_2$ | 20 | 13.3 | 1.0 |
| fourth nozzle N4 | $N_2$ | 3 | 13.0 | 1.0 |
| fifth nozzle N5 | $H_2$ | 100 | 15.6 | 2.0 |
| sixth nozzle N6 | $N_2$ | 3 | 0.7 | 1.0 |
| Seventh nozzle N7 | $O_2$ | 35 | 3.2 | 2.0 |

COMPARATIVE EXAMPLE 1

Figure 3:
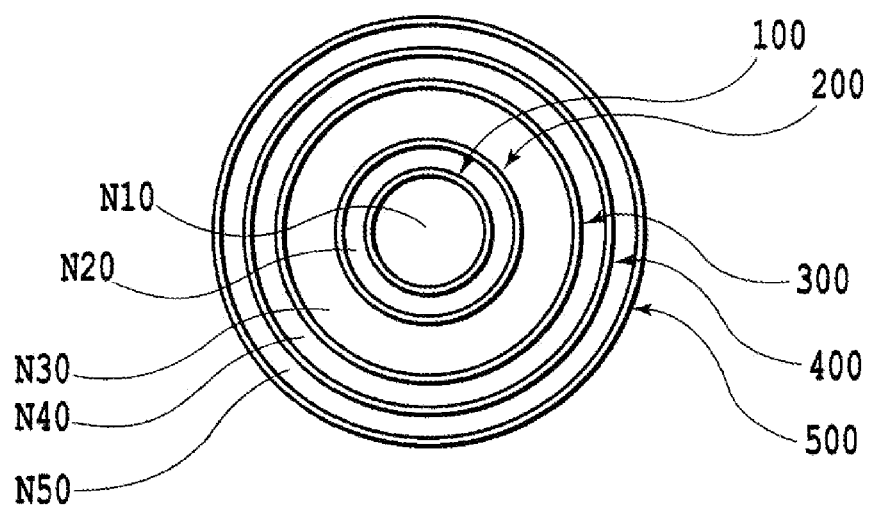
FIG. 3 is a front view showing a nozzle arrangement of a burner with a coaxial five tube struction, which was used in Comparative Example 1.

FIG. 3 is a front view showing a nozzle arrangement of a burner having a coaxially multiple tube structure, which was used in Comparative Example 1. The burner shown in FIG. 3 has a coaxial five tube structure including the first tube 100, the second tube 200, the third tube 300, the fourth tube 400, and the fifth tube 500 that are arranged coaxially and have different diameters from each other. The first tube 100 defines a circular first nozzle N10. The first tube 100 and the second tube 200 define an annular second nozzle N20. The second tube 200 and the third tube 300 define an annular third nozzle N30. The third tube 300 and the fourth tube 400 define an annular fourth nozzle N40. The fourth tube 400 and the fifth tube 500 define an annular fifth nozzle N50.

In Comparative Example 1, a mixed gas of a glass raw material $SiCl_4$ mixed with a combustion assisting gas $O_2$ was supplied to the first nozzle N10. A burnable gas $H_2$ was supplied to the third nozzle N30. A combustion assisting gas $O_2$ was supplied to the fifth nozzle N50. Further, a sealing gas $N_2$ was supplied to the second nozzle N20 and the fourth nozzle N40, respectively.

Under the above gas conditions, 10 kg of glass particles were deposited on the starting rod. Table 3 shows collectively type, flow rate and flow velocity of gases supplied to the respective nozzles, and the thickness of the respective gas flows in the radial direction of the respective nozzles at the respective outlets thereof.

TABLE 3

(Comparative Example 1)

|  | gas used | flow rate (SLM) | flow velocity (m/s) | thickness of gas flow (mm) |
| --- | --- | --- | --- | --- |
| first nozzle N10 | $SiCl_4 + O_2$ | 20 | 15.2 | 2.6 |
| Second nozzle N20 | $N_2$ | 3 | 2.0 | 1.0 |
| third nozzle N30 | $H_2$ | 100 | 15.7 | 2.5 |
| fourth nozzle N40 | $N_2$ | 3 | 0.8 | 1.0 |
| fifth nozzle N50 | $O_2$ | 35 | 3.3 | 2.0 |

Example 1 is compared with Comparative Example 1. The flow rate and flow velocity of the mixed gas of the glass raw material gas $SiCl_4$ with the combustion assisting gas $O_2$ were the same in Example 1 and Comparative Example 1. But, while the thickness of the gas flow was 1.0 mm in Example 1, the thickness of the gas flow was 2.6 mm in Comparative Example 1. That is, the thickness of the gas flow of the mixed gas of the glass raw material gas $SiCl_4$ with combustion assisting gas $O_2$ in Example 1 was remarkably thinner than that of the gas flow of the mixed gas of the glass raw material gas $SiCl_4$ with the combustion assisting gas $O_2$ in Comparative Example 1. In Example 2, the thickness of the gas flow of the mixed gas of the glass raw material $SiCl_4$ with the burnable gas $H_2$ was also thin like in the case of Example 1.

In Examples 1 and 2, the thickness of the gas flow of the glass raw material gas ejected from the nozzle N3 is immensely thin and therefore, it was mixed promptly with the burnable gas and the combustion assisting gas ejected from other nozzles to promote the hydrolysis reaction. Consequently, the deposition efficiencies in Examples 1 and 2 were improved to 63% and 61%, respectively, while that of Comparative Example 1 was 58%.

Figure 4:
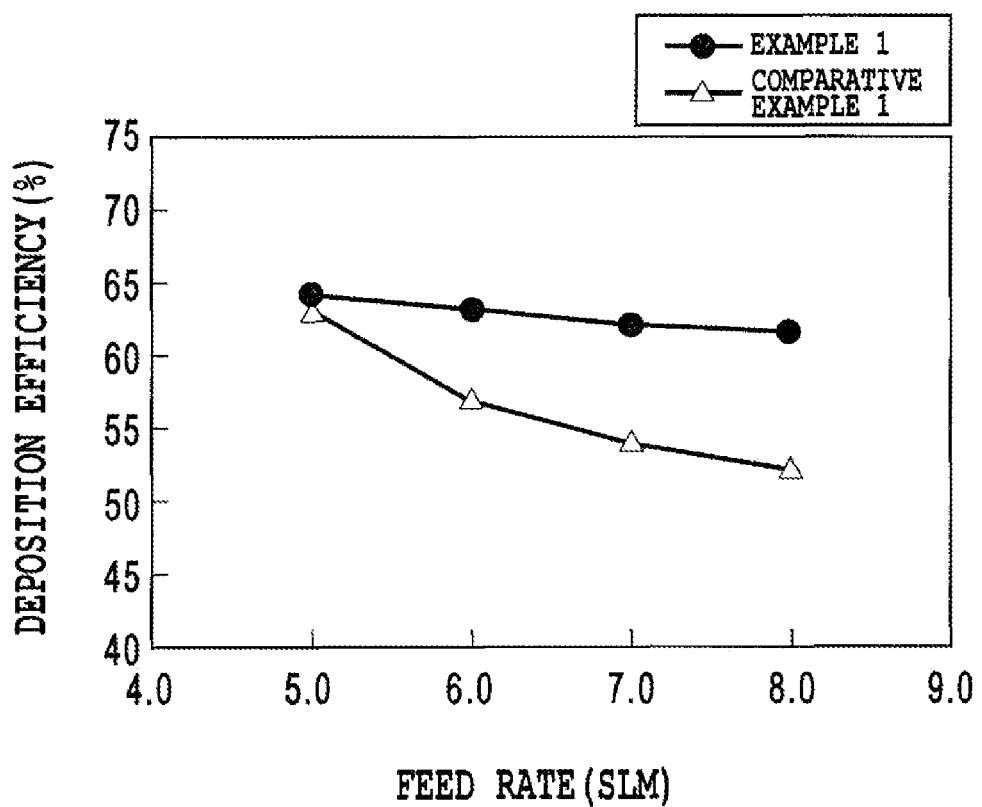
FIG. 4 is a graph showing relationships between feed rate of a glass raw material gas and deposition efficiency thereof in Examples 1 and Comparative Example 1.

FIG. 4 shows relationships between feed rate and deposition efficiency of the glass raw material $SiCl_4$ when varying the feed rate of the glass raw material gas in Example 1and Comparative Example 1, respectively. It is understood that, the deposition efficiency in Example 1 fluctuates only slightly, while that in Comparative Example 1 falls significantly as the feed rate of the glass raw material gas increases.

According to the present invention, the productivity of the optical fiber preform can be improved remarkably.

Having described preferred embodiments of the invention with reference to the accompanying drawings, it is to be understood that the invention is not limited to the specific embodiments and examples, and that various changes and modifications may be effected therein by those skilled in the art without departing from the scope or spirit of the invention as defined by appended claims.

What is claimed is:

1. A method of fabricating an optical fiber preform comprising the steps of:
    ejecting a glass raw material gas, a burnable gas, a combustion assisting gas and a sealing gas from a plurality of nozzles of a burner, including a circular first nozzle, so as to hydrolyze the glass raw material gas in flame and to generate glass particles, the burner having a plurality of tubes with different diameters from each other and being coaxially arranged, the plurality of nozzles being defined by the plurality of tubes; and moving the burner relative to a starting rod so as to deposit the glass particles thereon, wherein in the ejecting step a mixed gas of the glass raw material gas mixed with the combustion assisting gas is ejected from an annular nozzle among the plurality of nozzles, the burnable gas is ejected from said circular first nozzle located inside the annular nozzle, and the burnable gas and the combustion assisting gas are ejected from outer nozzles located outside the annular nozzle, respectively.

2. The method according to claim 1, wherein in the ejecting step the sealing gas is ejected from nozzles arranged between the annular nozzle and the circular first nozzle, between the annular nozzle and the outer nozzle and between the outer nozzles.

3. A method of fabricating an optical fiber preform comprising the steps of:

ejecting a glass raw material gas, a burnable gas, a combustion assisting gas and a sealing gas from a plurality of nozzles of a burner, including a circular first nozzle, so as to hydrolyze the glass raw material gas in flame and generate glass particles, the burner having a plurality of tubes with different diameters from each other and being coaxially arranged, the plurality of nozzles being defined by the plurality of tubes; and moving the burner relative to a starting rod so as to deposit the glass particles thereon, wherein in the ejecting step a mixed gas of the glass raw material gas mixed with the burnable gas is ejected from an annular nozzle among the plurality of nozzles, the combustion assisting gas is ejected from said circular first nozzle located inside the annular nozzle, and the burnable gas and the combustion assisting gas are ejected from the outer nozzles located outside the annular nozzle, respectively.

4. The method according to claim 3, wherein in the ejecting step the sealing gas is ejected from nozzles arranged between the annular nozzle and the circular first nozzle, between the annular nozzle and the outer nozzle and between the outer nozzles.

* * * * *